UNITED STATES PATENT OFFICE.

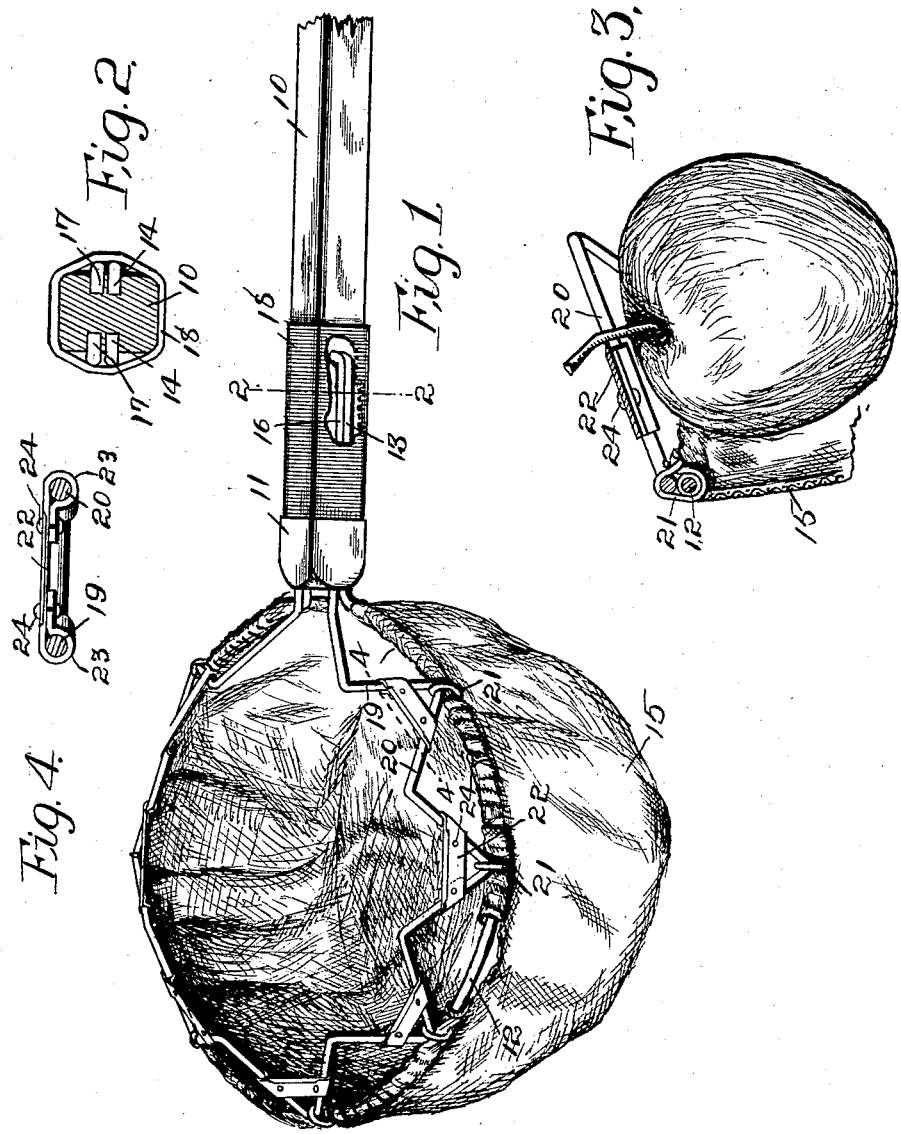

ABRAM E. FRAMPTON, OF BOONE, IOWA.

FRUIT-PICKER.

No. 908,235.  Specification of Letters Patent.  Patented Dec. 29, 1908.

Application filed March 13, 1908. Serial No. 420,938.

*To all whom it may concern:*

Be it known that I, ABRAM E. FRAMPTON, a citizen of the United States, residing at Boone, in the county of Boone and State of Iowa, have invented certain new and useful Improvements in Fruit-Pickers, of which the following is a specification.

The object of my invention is to provide a fruit picker of simple, durable and inexpensive construction, by the use of which the operator may engage fruit of various kinds hanging to the tree in any position and may then quickly and easily detach the fruit from the tree either by pulling the stem of the fruit from the branch or by cutting the stem.

A further object is to provide a series of small knife blades of simple light and inexpensive construction that may be quickly and easily attached to the fruit picker for the purpose of cutting fruit stems.

My invention consists in the construction, arrangement and combination of the various parts of the device whereby the objects contemplated are obtained, as hereinafter more fully set forth, pointed out in my claims and illustrated in the accompanying drawings, in which—

Figure 1 shows a perspective view of the complete fruit picker embodying my invention. Fig. 2 shows a sectional view on the line 2—2 of Fig. 1. Fig. 3 shows a detail sectional view of a part of the fruit picker on an enlarged scale showing one of the knife blades in engagement with a stem and Fig. 4 shows a detail sectional view on the line 4—4 of Fig. 1.

Referring to the accompanying drawings the reference numeral 10 is used to indicate a wooden handle for the fruit picker, which handle may be of any desired size or shape. On one end of the handle is a ferrule 11.

The reference numeral 12 is used to indicate a circular wire loop having its end portions 13 extended parallel with each other on opposite sides of the handle 10, the ends 14 thereof being inserted in openings in the handle, as clearly shown in Fig. 2. Attached to the circular loop 12 is a bag 15.

I provide for engaging fruit in order to remove it from branches a wire which is provided with substantially right angled bends throughout its body portion and its end portions 16 are extended parallel with each other on opposite sides of the handle 10 and the ends 17 thereof are inserted in openings in the handle, as clearly shown in Fig. 2.

In order to firmly secure the end portions 13 and 16 to the handle I preferably wrap a wire 18 around the handle and over said end portions, as clearly shown in Figs. 1 and 2. The body portion of the wire extends around the top of the bag and forms a series of V-shaped portions, the sides of which are straight and are indicated by the numerals 19 and 20. The outer ends of said V-shaped portions are permanently connected with the loop 12 by means of wire fastening loops 21 and the inner ends of the V-shaped portions are inclined upwardly and inwardly. It is important that the inner ends of said V-shaped portions be maintained in their upwardly and inwardly inclined positions and this is done by firmly securing the end portions 16 to the handle. Hence it is not necessary to provide any rigid attachment between the outer ends of the V-shaped portions and the loop 12.

In order to provide for cutting fruit stems I use a series of small knife blades, each made of a thin piece of sheet metal, comprising a straight body portion 22 sharpened at one edge and having loops 23 formed on its ends designed to encircle the parts 19 and 20 near the outer end of the V-shaped portions. The ends of the loops 23 are permanently connected with the body portion 22 preferably by rivets 24. In this way the blades are firmly held to the V-shaped portions against movement in any direction, and furthermore the said blades tend to brace and support the V-shaped portions and to hold them in their upwardly and inwardly inclined positions. The loop 12, the wire that has the V-shaped portions in it and the knife blades are all arranged so that they mutually brace and support each other, and hence none of them need be made heavy and yet when combined the fruit picker will be strong and durable.

In practical use I first place the bag in position so that the fruit to be picked is in the center of the bag and I then move the bag so that the fruit stem is in one of the V-shaped portions; then the knife blade will engage the fruit stem and the fruit stem may thus be severed and the fruit will drop into the bag. By having the V-shaped portions inclined both upwardly and inwardly I accomplish a very desirable result in a device of this kind, because in the event that the article of fruit to be picked is hanging close to a heavy branch or tree trunk, then the operator may, by tilting the bag to one side, insert the wire containing the V-shaped portions between the article of fruit and the obstruction and thus the bag may be moved to position with the fruit stem between the sides of the V-shaped portions no matter what the position of the obstruction may be relative to the person operating the fruit picker. In devices of this kind where the fruit picking wires extend straight inwardly on the outer rim or loop, it is necessary for the operator to stand in such position that the bag may be placed under the fruit to be picked, and in order to do this the fruit must stand clear from any obstruction; whereas with my device if the fruit were hanging close to a solid wall the wire having the V-shaped portions therein could be moved upwardly between the wall and the fruit and then turned to position where the fruit could be pulled from the branch.

Having thus described my invention, what I claim and desire to secure by Letters Patent of the United States, therefore is:—

1. An improved fruit picker, comprising a handle, a circular wire loop connected with the handle, a bag supported by the loop, a second circular wire loop having a series of V-shaped portions therein, the ends of said second loop being secured to the handle, and means for connecting the outer parts of said V-shaped portions to the said loop, the inner ends of said V-shaped portions being extended upwardly and inwardly.

2. A fruit picker, comprising a handle, a circular wire loop having its ends extended parallel with each other on opposite sides of the handle, a bag secured to said loop, a second wire loop having formed in its body portion a series of V-shaped portions, means for securing the outer parts of said V-shaped portions to the said loop, the inner parts of said V-shaped portions being inclined inwardly and away from the bag, the ends of said second loop being extended parallel with each other on opposite sides of the handle and inserted in the handle and means for securing the ends of both loops to the handle against movement in any direction.

3. A fruit picker, comprising a handle, a circular wire loop having its ends extended parallel with each other on opposite sides of the handle, a bag secured to said loop, a second loop having formed in its body portion a series of V-shaped portions, means for securing the outer parts of said V-shaped portions to the said loop, the inner parts of said V-shaped portions being inclined inwardly and away from the bag, the ends of said second loop being extended parallel with each other on opposite sides of the handle and inserted in the handle and means for securing the ends of both loops to the handle against movement in any direction, and a series of knife blades each comprising a straight body portion, sharpened at one edge and having loops at its ends arranged in position overlapping the sides of one of said V-shaped portions to the body portion of the blade.

ABRAM E. FRAMPTON.

Witnesses:
S. L. CHRISTY,
RALPH ORWIG.